US010851566B2

(12) United States Patent
Deppe et al.

(10) Patent No.: US 10,851,566 B2
(45) Date of Patent: Dec. 1, 2020

(54) LATCH ACTUATOR AND METHOD OF ACTUATING A LATCH

(71) Applicant: SCHUKRA GERÄTEBAU GMBH, Berndorf (AT)

(72) Inventors: Rüdiger Deppe, Lenting (DE); Joachim Carl, Stein (DE); Maxime Samain, Nuremberg (DE); Gunter Maierhofer, Veitsbronn (DE)

(73) Assignee: SCHUKRA GERÄTEBAU GMBH, Berndorf (AT)

(*) Notice: Subject to any disclaimer, the term of this patent is extended or adjusted under 35 U.S.C. 154(b) by 289 days.

(21) Appl. No.: 15/305,916

(22) PCT Filed: Apr. 21, 2015

(86) PCT No.: PCT/EP2015/058565
§ 371 (c)(1),
(2) Date: Oct. 21, 2016

(87) PCT Pub. No.: WO2015/162116
PCT Pub. Date: Oct. 29, 2015

(65) Prior Publication Data
US 2017/0044805 A1 Feb. 16, 2017

(30) Foreign Application Priority Data
Apr. 22, 2014 (EP) .................. 14165401

(51) Int. Cl.
E05B 81/28 (2014.01)
E05B 81/06 (2014.01)
(Continued)

(52) U.S. Cl.
CPC ............ E05B 81/28 (2013.01); B60N 2/366 (2013.01); E05B 81/06 (2013.01); E05B 81/25 (2013.01);
(Continued)

(58) Field of Classification Search
CPC .......... E05B 81/28; E05B 81/32; E05B 81/34; E05B 81/36; E05B 81/38; E05B 81/40;
(Continued)

(56) References Cited

U.S. PATENT DOCUMENTS 323,998 A * 8/1885 Baringer ................. E05C 9/041
292/39
4,269,440 A * 5/1981 Gelhard .................. E05B 81/06
292/201
(Continued)

FOREIGN PATENT DOCUMENTS

CN 1210065 A 3/1999
CN 101356073 A 1/2009
(Continued)

OTHER PUBLICATIONS

Search Report from the International Searching Authority for Application No. PCT/EP2015/058565 dated Jul. 8, 2015 (6 pages).
(Continued)

Primary Examiner — Kristina R Fulton
Assistant Examiner — Faria F Ahmad
(74) Attorney, Agent, or Firm — Michael Best & Friedrich LLP

(57) ABSTRACT

A latch actuator comprises a motor, a speed reduction gearing coupled to an output shaft of the motor, a spindle, and a motion conversion mechanism. The spindle has a threaded portion in engagement with the speed reduction gearing. The spindle is supported to be rotatable about an axis. The threaded portion is rotationally fixed relative to the spindle. The motion conversion mechanism is configured to cause a displacement of the spindle along the axis when the spindle rotates.

14 Claims, 7 Drawing Sheets

(51) Int. Cl.
| | |
|---|---|
| *E05B 81/24* | (2014.01) |
| *E05B 81/34* | (2014.01) |
| *B60N 2/36* | (2006.01) |
| *F16H 25/20* | (2006.01) |
| *F16H 25/24* | (2006.01) |
| *F16H 25/18* | (2006.01) |
| *E05B 81/32* | (2014.01) |
| *E05B 81/38* | (2014.01) |
| *E05B 81/36* | (2014.01) |
| *E05B 47/00* | (2006.01) |
| *E05B 81/40* | (2014.01) |

(52) U.S. Cl.
CPC ......... *E05B 81/34* (2013.01); *F16H 25/2015* (2013.01); *F16H 25/24* (2013.01); *E05B 81/32* (2013.01); *E05B 81/36* (2013.01); *E05B 81/38* (2013.01); *E05B 81/40* (2013.01); *E05B 2047/002* (2013.01); *E05B 2047/005* (2013.01); *E05B 2047/0048* (2013.01); *E05B 2047/0052* (2013.01); *E05B 2047/0053* (2013.01); *E05B 2047/0056* (2013.01); *F16H 25/186* (2013.01); *F16H 2025/209* (2013.01); *F16H 2025/2031* (2013.01); *Y10S 292/23* (2013.01); *Y10T 292/03* (2015.04); *Y10T 292/108* (2015.04); *Y10T 292/1021* (2015.04); *Y10T 292/1047* (2015.04); *Y10T 292/1082* (2015.04); *Y10T 292/14* (2015.04); *Y10T 292/307* (2015.04); *Y10T 292/308* (2015.04)

(58) Field of Classification Search
CPC .............. E05B 2047/002; Y10T 292/14; Y10T 292/1021; Y10T 292/307; Y10T 292/308; Y10T 292/03; B60N 2/366; F16H 25/2015; F16H 25/24; F16H 25/186; F16H 2025/2031; F16H 2025/209; Y10S 292/23
USPC .............. 292/1, 200, 201, 216, DIG. 23, 199
See application file for complete search history.

(56) References Cited

U.S. PATENT DOCUMENTS

| | | | | |
|---|---|---|---|---|
| 4,290,634 A * | 9/1981 | Gelhard | E05B 81/25 | 292/201 |
| 4,739,677 A * | 4/1988 | Kofink | E05B 81/25 | 292/201 |
| 4,833,465 A * | 5/1989 | Abend | E05B 47/0012 | 340/5.65 |
| 4,895,036 A * | 1/1990 | Larson | E05B 21/066 | 70/284 |
| 4,916,927 A * | 4/1990 | O'Connell | E05B 17/04 | 70/276 |
| 4,921,288 A * | 5/1990 | Cifuentes | E05B 81/25 | 292/114 |
| 4,936,894 A * | 6/1990 | Larson | E05B 37/16 | 70/298 |
| 4,987,788 A | 1/1991 | Bausch | | |
| 5,078,436 A * | 1/1992 | Kleefeldt | E05B 81/06 | 292/201 |
| 5,140,317 A * | 8/1992 | Hyatt, Jr. | G07B 15/00 | 235/382 |
| 5,265,452 A * | 11/1993 | Dawson | E05B 17/042 | 292/142 |
| 5,419,597 A * | 5/1995 | Brackmann | E05B 81/06 | 292/201 |
| 5,439,261 A * | 8/1995 | O≤Hare | E05B 81/25 | 292/201 |
| 5,531,086 A * | 7/1996 | Bryant | E05B 47/0012 | 292/142 |
| 5,542,274 A * | 8/1996 | Thordmark | E05B 47/063 | 70/495 |
| 5,546,777 A * | 8/1996 | Liu | E05B 81/25 | 292/144 |
| 5,552,777 A * | 9/1996 | Gokcebay | E05B 47/0611 | 340/5.54 |
| 5,553,351 A * | 9/1996 | Starks | E05D 11/1007 | 16/223 |
| 5,609,051 A * | 3/1997 | Donaldson | E05B 47/0673 | 340/5.54 |
| 5,791,179 A * | 8/1998 | Brask | E05B 13/004 | 292/142 |
| 5,826,450 A * | 10/1998 | Lerchner | E05B 35/14 | 70/278.3 |
| 5,839,305 A * | 11/1998 | Aston | E05B 47/0615 | 70/283.1 |
| 5,839,307 A * | 11/1998 | Field | E05B 47/0042 | 70/283 |
| 5,896,765 A * | 4/1999 | Peyre | B60R 25/02153 | 292/144 |
| 6,119,538 A * | 9/2000 | Chang | E05B 81/25 | 292/144 |
| 6,244,394 B1 | 6/2001 | Gutierrez et al. | | |
| 6,318,196 B1 * | 11/2001 | Chang | E05B 81/25 | 292/144 |
| 6,386,600 B1 * | 5/2002 | Kalsi | E05B 81/14 | 292/201 |
| 6,497,162 B2 * | 12/2002 | Spurr | E05B 81/25 | 292/201 |
| 6,983,962 B2 * | 1/2006 | Keightley | E05B 15/10 | 292/142 |
| 6,997,488 B2 * | 2/2006 | Kurten | E05B 81/14 | 292/201 |
| 7,114,407 B1 * | 10/2006 | Colin | F16H 19/04 | 74/89.18 |
| 7,329,199 B2 | 2/2008 | Blendea et al. | | |
| 7,475,920 B2 * | 1/2009 | Bigazzi | E05B 81/14 | 292/201 |
| 8,368,507 B2 * | 2/2013 | Conreux | G07C 9/00111 | 340/5.2 |
| 8,677,690 B2 * | 3/2014 | Lee | B60K 15/05 | 296/97.22 |
| 8,870,241 B2 * | 10/2014 | Lee | E05B 81/06 | 292/144 |
| 9,041,510 B2 * | 5/2015 | Wolski | G07C 9/00309 | 340/5.6 |
| 9,656,544 B2 * | 5/2017 | Frommann | B60K 15/05 | |
| 9,845,624 B2 * | 12/2017 | Erices | E05B 81/28 | |
| 10,063,122 B2 * | 8/2018 | Reddmann | E05B 85/02 | |
| 10,087,662 B2 * | 10/2018 | Kraus | E05B 81/06 | |
| 10,214,946 B2 * | 2/2019 | Fukumoto | E05B 77/42 | |
| 10,400,478 B2 * | 9/2019 | Reese | E05B 47/02 | |
| 2001/0015305 A1 * | 8/2001 | Spurr | E05B 81/25 | 185/40 R |
| 2001/0023620 A1 * | 9/2001 | Spurr | E05B 81/25 | 74/412 R |
| 2002/0084656 A1 * | 7/2002 | Lin | E05B 47/0012 | 292/160 |
| 2002/0095964 A1 * | 7/2002 | Davis | E05B 15/0053 | 70/278.3 |
| 2004/0012352 A1 * | 1/2004 | Kachouh | E05B 81/06 | 318/272 |
| 2004/0056489 A1 * | 3/2004 | Boecker | E05B 81/14 | 292/201 |
| 2004/0099077 A1 * | 5/2004 | Weis | E05B 81/06 | 74/425 |
| 2004/0232706 A1 | 11/2004 | Kurten et al. | | |
| 2005/0172685 A1 * | 8/2005 | Keightly | E05B 47/0012 | 70/279.1 |
| 2005/0184539 A1 * | 8/2005 | Milo | E05B 47/0046 | 292/340 |
| 2005/0200137 A1 * | 9/2005 | Nelsen | E05B 81/06 | 292/201 |
| 2006/0137414 A1 * | 6/2006 | Denison | E05B 47/0012 | 70/257 |

(56) References Cited

U.S. PATENT DOCUMENTS

| | | | | |
|---|---|---|---|---|
| 2007/0126243 | A1* | 6/2007 | Papanikolaou | E05B 81/06 292/201 |
| 2007/0152455 | A1* | 7/2007 | Ko | E05B 15/004 292/201 |
| 2008/0060396 | A1 | 3/2008 | Harvey | |
| 2008/0250829 | A1* | 10/2008 | Kamiki | E05B 47/0002 70/344 |
| 2008/0307837 | A1* | 12/2008 | Greiner | E05B 47/0012 70/282 |
| 2009/0160198 | A1* | 6/2009 | Yoda | E05B 81/06 292/201 |
| 2009/0173114 | A1* | 7/2009 | Lin | E05B 47/0012 70/91 |
| 2009/0173120 | A1* | 7/2009 | Lin | E05B 17/0058 70/279.1 |
| 2009/0236862 | A1* | 9/2009 | Tomaszewski | E05B 15/004 292/165 |
| 2010/0000274 | A1* | 1/2010 | Viso Cabrera | E05B 17/22 70/278.7 |
| 2011/0012380 | A1* | 1/2011 | Bendel | E05B 81/20 292/341.16 |
| 2011/0036131 | A1* | 2/2011 | Chiou | E05B 47/0012 70/91 |
| 2011/0066288 | A1* | 3/2011 | Sparenberg | E05B 47/026 700/275 |
| 2011/0074166 | A1* | 3/2011 | Taurasi | E05B 81/14 292/27 |
| 2011/0084506 | A1* | 4/2011 | Roatis | E05B 17/0029 292/240 |
| 2011/0240418 | A1 | 10/2011 | Tachiiri | |
| 2012/0313382 | A1* | 12/2012 | Lee | E05B 81/06 292/144 |
| 2013/0160538 | A1* | 6/2013 | Taurasi, I | G01M 17/00 73/117.01 |
| 2013/0214543 | A1* | 8/2013 | Rice | E05B 77/00 292/97 |
| 2013/0219974 | A1* | 8/2013 | Lange | E05B 81/14 70/91 |
| 2014/0217748 | A1* | 8/2014 | Blumenthal | B60N 2/0232 292/144 |
| 2015/0028603 | A1* | 1/2015 | Vazquez | E05B 81/06 292/200 |
| 2015/0076838 | A1* | 3/2015 | Rajagopal | E05B 81/06 292/201 |
| 2015/0135867 | A1* | 5/2015 | Cheng | E05B 81/06 74/89.23 |
| 2015/0137530 | A1* | 5/2015 | Vazquez | E05B 81/06 292/200 |
| 2015/0308165 | A1* | 10/2015 | Scholz | E05B 85/26 292/199 |
| 2015/0368938 | A1* | 12/2015 | Erices | E05B 81/28 292/143 |
| 2016/0201773 | A1* | 7/2016 | Ta | E05B 81/34 74/421 A |
| 2017/0058574 | A1* | 3/2017 | Cheng | E05B 81/40 |
| 2017/0081885 | A1* | 3/2017 | Yun | E05F 15/40 |
| 2018/0171677 | A1* | 6/2018 | Im | E05B 81/14 |
| 2018/0171680 | A1* | 6/2018 | Hunt | E05B 81/20 |
| 2018/0187459 | A1* | 7/2018 | Yokota | E05B 79/20 |
| 2018/0223568 | A1* | 8/2018 | Cho | E05B 81/15 |

FOREIGN PATENT DOCUMENTS

| | | |
|---|---|---|
| CN | 102574317 A | 7/2012 |
| CN | 102913074 A | 2/2013 |
| DE | 3145217 A1 | 5/1983 |
| DE | 10344244 | 4/2004 |
| DE | 102010003545 | 10/2011 |
| DE | 102011006475 | 10/2012 |
| EP | 0258581 | 3/1988 |
| FR | 2765910 | 1/1999 |
| KR | 20020037319 A | 5/2002 |
| WO | 2011057694 | 5/2011 |

OTHER PUBLICATIONS

Written Opinion of the International Search Authority for Application No. PCT/EP2015/058565 dated Jul. 8, 2015 (6 pages).

Notice of Preliminary Rejection from the Korean Intellectual Property Office for Application No. 10-2016-7030971 dated Jun. 28, 2019 (12 pages).

Office Action from the State Intellectual Property Office of the People's Republic of China for Application No. 201580020448.2 dated May 9, 2018 (6 pages).

* cited by examiner

LATCH ACTUATOR AND METHOD OF ACTUATING A LATCH

TECHNICAL FIELD

Embodiments of the invention relate to actuators and methods of actuating a latch. Embodiments of the invention relate in particular to actuators for vehicles, e.g. for vehicle doors or other latches in vehicles.

BACKGROUND

Latches are widely used in vehicles, e.g. in door locks of vehicles or for securing seats of a vehicle in a desired position. Conventional manual latch actuation systems may include a manual button and a linkage interconnecting the button with a locking mechanism. By manually pulling or pushing the button, the latch may be actuated.

Power actuation systems continue to evidence increased popularity. Generally, the power actuator has an electric motor coupled to an output member that is coupled to the latch. When the motor is energized, the output member is driven to automatically actuate the latch. For illustration, the motor may be energized to lock or unlock a door.

Power actuation systems may be configured such that the output member is displaced in a purely translatory manner. A rotary to linear motion conversion mechanism may be used to convert a rotary motion of an output shaft of an electric motor to a purely translatory motion of the output member. The actuator of such a power actuation system may require large installation space and/or may have a complex construction. Systems in which the actuator has a rotating disk or other lever element as an output member which performs a purely rotational movement may likewise require large installation space.

With the integration of an ever increasing number of components into vehicles, it would be desirable to provide a latch actuator which can be installed in a compact installation space. It would also be desirable that the latch actuator can be produced in a cost-efficient way.

SUMMARY

There is a need in the art for actuators and methods for actuating a latch which address at least some of the above demands. There is in particular a need for actuators and methods for actuating a latch using an actuator, wherein the actuator can be installed in a compact installation space while having low weight. There is also a need for actuators which can be produced in a cost-efficient and reliable way.

According to embodiments, a latch actuator is provided. The latch actuator comprises a spindle. In operation of the actuator, the spindle is rotated about a rotation axis. A motion conversion mechanism is configured to cause the spindle to be displaced along the rotation axis when the spindle rotates, leading to a combination of axial displacement and rotation of the spindle.

The spindle is the output member of the latch actuator and is both rotated and displaced along the rotation axis in operation of the latch actuator. By providing a spindle which is both rotatable and axially displaceable along the rotation axis, a simple and compact actuator design may be attained.

The spindle may be supported on a housing of the latch actuator. The motion conversion mechanism may comprise an engagement feature which extends about the rotation axis with a pitch. The engagement feature may be formed on the housing. The engagement portion may extend helically about the rotation axis.

A latch actuator according to an embodiment comprises a motor, a speed reduction gearing coupled to an output shaft of the motor, and a spindle having a threaded portion in engagement with the speed reduction gearing. The spindle may be supported to be rotatable about an axis. The threaded portion may be rotationally fixed relative to the spindle. The latch actuator comprises a motion conversion mechanism configured to cause a displacement of the spindle along the axis when the spindle rotates.

The threaded portion may be an integral component of the spindle. A spindle body and the threaded portion may be formed as one piece, e.g. by injection molding.

The motion conversion mechanism may comprise an engagement feature engaged with the spindle. The engagement feature may have a pitch along the axis. The engagement feature may extend helically about the axis about which the spindle is rotatable. The engagement feature may have at least one wall which extends along helical line about the axis.

The pitch of the engagement feature may be different from a pitch of the threaded portion of the spindle.

The engagement feature may be stationary relative to the motor.

The latch actuator may comprise a housing in which the motor and the speed reduction gearing are accommodated. The engagement feature may be formed on the housing.

The engagement feature may comprise a recess engaged with a projection of the spindle. The recess may have a side wall, and at least a portion of the side wall may extend along a helical line around the axis with the pitch.

The projection of the spindle may be a pin projecting from a surface of the spindle. The pin may project from the threaded portion. The pin may be integrally formed with the spindle At least portion of the projection may have a pitch which is equal to the pitch of the recess. The projection may be formed on the surface of the spindle so as to extend helically about the axis.

The threaded portion in engagement with the speed reduction gearing may form the projection engaged with the recess.

The threaded portion of the spindle which is engaged with the speed reduction gearing may comprise a plurality of teeth. A base of the plurality of teeth may extend about the spindle with the pitch. The plurality of teeth may have a base line which extends helically about the spindle. Each tooth of the plurality of teeth may be configured for engagement with a worm of the speed reduction gearing. Each tooth of the plurality of teeth may have a side wall which is slanted relative to a circumferential direction of the spindle and which extends about the axis with the pitch.

The base line of the plurality of teeth may include at least one full, i.e. 360°, turn of a helix.

The engagement feature may be formed in a bushing of the spindle. The bushing may rotatably support the spindle on the housing. The bushing may be formed integrally with the housing of the latch actuator.

The spindle may be coupled to a latch mechanism. The spindle may be directly connected to the latch or may be coupled to the latch through a linkage of the latch mechanism.

The latch may be a latch of a door lock, a latch for securing a seat or backrest, or a latch securing another vehicle components.

The latch may have a receptacle in which the spindle is rotatably received. The receptacle may be a cap having a diameter to receive an end of the spindle. The cap may be integrally formed on a displaceable component of the latch mechanism.

The speed reduction gearing may comprise at least one worm reduction gearing.

The speed reduction gearing may comprise a plurality of speed reduction stages. The speed reduction gearing may comprise a first speed reduction stage and a second speed reduction stage. One or both of the first and second speed reduction stages may be worm gearings.

The threaded portion may extend along the axis of the spindle. The threaded portion may extend along the axis of the spindle by a distance which corresponds to the displacement of the spindle along its axis.

The housing of the latch actuator may be configured to support the motor and the spindle such that the axis of the spindle is parallel to an axis of an output shaft of the motor.

At least one of the spindle and the housing may comprise an end stop for limiting movement of the spindle along the axial direction. An end stop may be formed on the spindle, and a mating engagement feature may be formed on the housing of the latch The spindle and the threaded portion may be integrally formed. The spindle and the threaded portion may be formed from a plastic material, e.g. as a molded component.

The latch actuator may be configured to withstand a load of at least 50 N acting on the spindle. The latch actuator may be configured to withstand a load of at least 50 N acting on the spindle.

The latch actuator may be configured such that the spindle travels 20 mm or more than 20 mm when activated. The latch actuator may be configured such that the spindle travels 20 mm in at most 0.5 seconds.

The latch actuator may comprise a sealing, e.g. a rubber sealing, between a housing and a cover of the housing.

The speed reduction gearing of the latch actuator may be self locking.

Teeth of a threaded portion of the spindle may have another pitch which may be different from the pitch defined by the motion conversion mechanism.

The latch actuator may be a door lock actuator.

A door according to an embodiment comprises a door lock having a latch, and the latch actuator according to an embodiment to actuate the door lock.

The door may have a cavity in which at least a part of the latch actuator is received.

The spindle of the latch actuator may be coupled to a latch or a lever of the door lock.

A vehicle according to an embodiment comprises a latch mechanism comprising a latch and a latch actuator connected to the latch mechanism to actuate the latch.

The latch mechanism may be a door lock. The latch mechanism may be a mechanism for locking a seat, a backrest, or another displaceable component of a vehicle in place.

According to another embodiment, a method of actuating a door lock may be provided. The method comprises energizing a motor of a latch actuator to rotationally drive a spindle of the latch actuator. The spindle may be coupled to a displaceable component of the door lock. A motion conversion mechanism may displace the spindle along a rotation axis of the spindle when the spindle is rotated to thereby actuate the door lock.

The latch actuator may be the latch actuator according to an embodiment.

Further features of the method and effects respectively attained thereby correspond to features of the actuator assembly and seat according to embodiments.

The devices and methods according to various embodiments may be utilized for door locking and door unlocking operations. The devices and methods according to the various embodiments may in particular be utilized for automatically locking and unlocking a door, in particular a vehicle door.

BRIEF DESCRIPTION OF DRAWINGS

Additional features and advantages of the invention will become more readily appreciated from the following detailed description of preferred or advantageous embodiments with reference to the accompanying drawings in which like or identical reference numerals designate like or identical components.

DETAILED DESCRIPTION OF EMBODIMENTS

Figure 1:
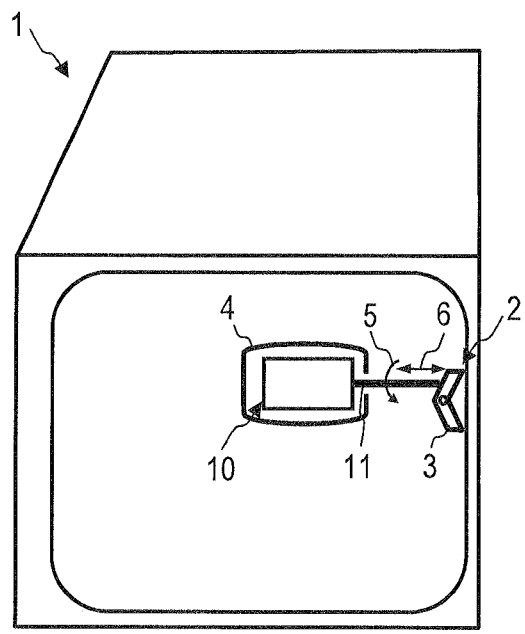
FIG. 1 is a schematic view of a vehicle component comprising a latch actuator according to an embodiment.

Exemplary embodiments of the invention will now be described with reference to the drawings. While some embodiments will be described in the context of specific fields of application, such as in the context of automotive vehicle doors, the embodiments are not limited to this field of application. The features of the various embodiments may be combined with each other unless specifically noted otherwise.

In the drawings, like reference numerals refer to like elements.

FIG. 1 is a schematic view of a door 1 according to an embodiment. The door 1 may be configured as a vehicle door. The door 1 may be configured as an automotive vehicle door. The door 1 may be configured as a car door.

The door 1 comprises a door lock 2. The door lock 2 has a latch mechanism. The latch mechanism comprises one displaceable component 3 or several displaceable components 3. The displaceable component 3 may be a latch of the door lock 2 which is configured for engagement with a mating bolt or may be a bolt configured for mating engagement with a latch. The displaceable component 3 may be a linkage, such as a lever or other displaceable component, which is coupled to the latch or the lock bolt of the door lock.

The door 1 comprises a latch actuator 10. The latch actuator 10 may be received in a cavity 4 of the door 1. The latch actuator 10 comprises a spindle 11. As will be explained in more detail with reference to FIG. 2 to FIG. 12, the latch actuator 10 is configured such that the spindle 11 performs a movement which is a combination of a rotation 5 about an axis and a displacement 6 along the axis. The axis may be the longitudinal axis of the spindle 11. The axis may be defined by at least one bushing in a housing of the latch actuator 10.

By allowing the spindle 11 to perform a movement which is a combination of the rotation 5 about the axis and the displacement 6 along the axis, the latch actuator 10 may be formed to have a low weight and compact construction.

Figure 2:
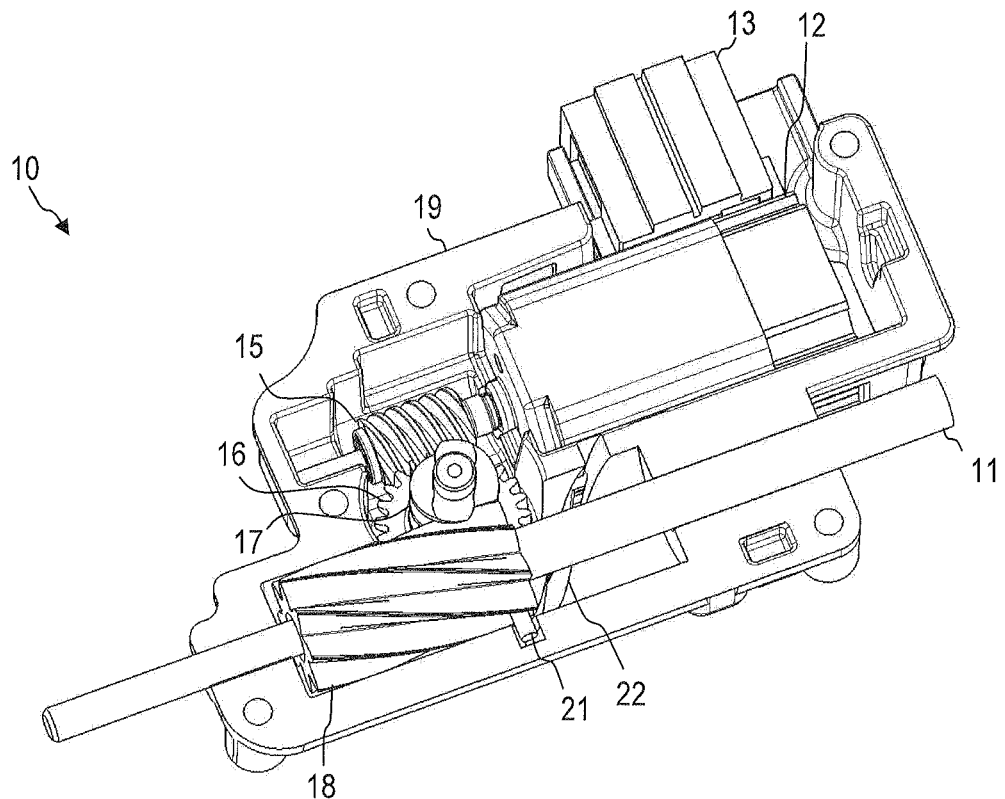
FIG. 2 is a perspective view of a latch actuator according to an embodiment with a cover removed.
Figure 3:
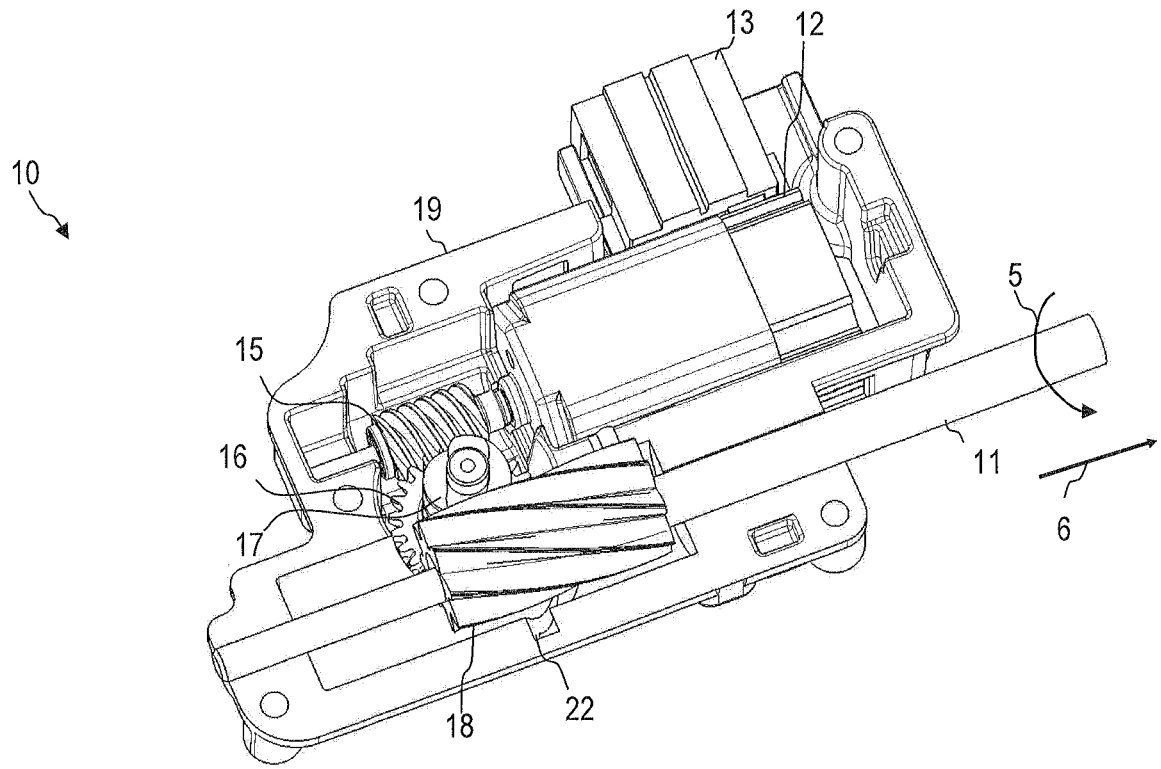
FIG. 3 is another perspective view of the latch actuator of FIG. 2.
Figure 4:
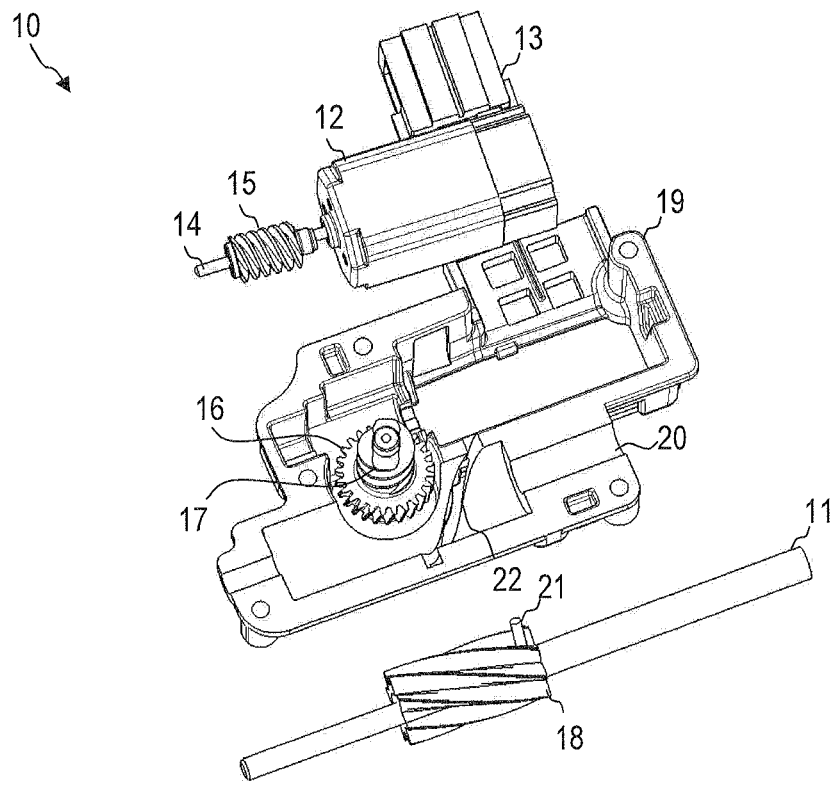
FIG. 4 is an exploded view of the latch actuator of FIG. 2.

FIG. 2 shows a latch actuator 10 according to an embodiment with a cover removed. FIG. 3 shows the latch actuator 10 of FIG. 2 when the spindle 11 has been displaced along its axis by rotation of the spindle 11. FIG. 4 is an exploded view of the latch actuator 10 of FIG. 2 with the cover removed.

The latch actuator 10 generally comprises a motor 12, a speed reduction gearing, the spindle 11 and a motion conversion mechanism which forces the spindle 11 to be displaced along the axis when the spindle 11 rotates about the axis.

The motor 12 may be an electric motor having a connector 13. The connector 13 may be removably attached to the motor 12 to allow the latch actuator 10 to be configured for use in different vehicles, for example.

The motor 12 has an output shaft 14. The output shaft 14 may be rotatably supported in a housing 19 of the latch actuator 10.

A speed reduction gearing may be connected in between the output shaft 14 of the motor 12 and the spindle 11. The speed reduction gearing may comprise one or several speed reduction stages. The speed reduction gearing may comprise a worm speed reduction gearing. The speed reduction gearing may be a two-stage worm speed reduction gearing.

A worm 15 may be provided on the output shaft of the motor 14. The worm 15 may be a molded plastic component. The worm 15 may be engaged with a worm wheel 16.

A further worm 17 may be provided such that it is rotationally fixed to the worm wheel 16. The worm wheel 16 and the further worm 17 may have the same rotation axis. The worm wheel 16 and the further worm 17 may be supported in the housing 19 such that they are rotatably about the same rotation axis.

The further worm 17 and the worm wheel 16 may be integrally formed. The further worm 17 and the worm wheel 16 may be formed as an integral molded plastic component.

The further worm 17 may be engaged with a threaded portion 18 formed on the spindle 11. The threaded portion 18 may be a further worm wheel in engagement with the further worm 17.

As shown in FIG. 2 to FIG. 4, the threaded portion 18 may extend along the spindle 11 by a length which is greater than the diameter of the further worm 17. The threaded portion 18 may extend along the spindle 11 by a length which defines the travel of the spindle 11 along the axis. The threaded portion 18 may have a length, measured along the axis of the spindle 11, which is equal to 20 mm or greater than 20 mm, for example.

The threaded portion 18 may be formed integrally with the spindle 11. The threaded portion 18 and the spindle 11 may be formed from plastic. The threaded portion 18 and the spindle 11 may be an integrally molded plastic component.

The spindle 11 may be supported in a housing 19 so as to be rotatable about an axis. The spindle 11 may be supported in the housing 19 so as to be both rotatable about the axis and displaceable along the axis. The spindle 11 and the motor 12 may be supported on the housing 19 in such a way that the axis of the spindle 11 is parallel to an axis of an output shaft of the motor 12.

The latch actuator 10 has a motion conversion mechanism which causes the spindle 11 to be displaced along its rotation axis when the spindle 11 rotates about its rotation axis. The motion conversion mechanism is operative to convert the rotational movement of an output 17 of the speed reduction gearing into a combined rotational movement 5 about the rotation axis and displacement 6 along the rotation axis.

The motion conversion mechanism may comprise at least one recess or projection which has a pitch along the rotation axis. The at least one recess or projection may extend helically about the rotation axis with the pitch. The at least one recess or projection having the pitch may be formed in the housing 19. Additionally or alternatively, a recess or projection having the pitch may be formed on the spindle 11.

In the actuator 10 of FIG. 2 to FIG. 4, the motion conversion mechanism comprises an engagement feature 22 formed in the housing 19, as best seen in FIG. 4. The engagement feature 22 is a recess which extends helically about the rotation axis of the spindle 11 which is defined by the housing 19. The pitch of the engagement feature 22 may be different from another pitch of the threaded portion 18 formed on the spindle 11.

The motion conversion mechanism may comprise a projection 21 which is received in the engagement feature 22. The projection 21 may be slidably received in the recess of the engagement feature 22. The spindle 11 may comprise the projection 21. I.e., the projection 21 may be integrally formed with the spindle 11. In another implementation, the projection 21 may be rigidly attached to the spindle 11. The projection 21 may be a pin. The projection 21 may have cylindrical shape received in the engagement feature 22.

The motion conversion mechanism may also define an end stop for the displacement of the spindle 11 along its axis. An abutment between the projection 21 and ends of the engagement feature 22 may respectively define an end of the travel path of the spindle 11.

In operation of the latch actuator 10, the motor 12 is energized. The speed reduction gearing causes the spindle 11 to rotate. A rotation speed of the spindle 11 is less than a rotation speed of the output shaft 14 of the motor 12.

The motion conversion mechanism causes the spindle to be displaced in a first direction 6 along its rotation axis when the spindle 11 performs a rotational movement 5 in a first direction of rotation. When a direction of rotation of the motor 12 is reversed, the motion conversion mechanism causes the spindle to be displaced in a second direction opposite to the first direction 6 along its rotation axis when the spindle 11 performs a rotational movement in a second direction of rotation which is opposite to the first direction of rotation.

While the spindle 11 is displaces along its rotation axis, the threaded portion 18 remains engaged with the further worm of the speed reduction gearing. The threaded portion 18 may have a length along the spindle 11 which is greater than a diameter of the further worm 17. The threaded portion 18 may have a length along the spindle 11 which is greater than the maximum distance by which the spindle 11 is displaceable by the latch actuator 10.

The latch actuator 10 may comprise a cover (not shown). A seal may be provided between the cover and the housing 19. The seal may be a rubber sealing. The latch actuator 10 may be configured to provide good ingress protection, with the motor and speed reduction gearing being accommodated in a shell defined by the housing 19 and the cover.

Various modifications of the latch actuator 10 may be implemented in other embodiments. For illustration, while the engagement feature can be formed as a helical recess 22 in the housing 19 and the projection 21 can be formed on the spindle 11, alternative configurations may be used in other embodiments. The spindle 11 may have a recess which extends helically around the spindle 11 with the pitch. The projection can be formed on the housing 19 so as to slide along the recess of the spindle 11, causing the spindle 11 to be displaced along its axis.

Figure 5:
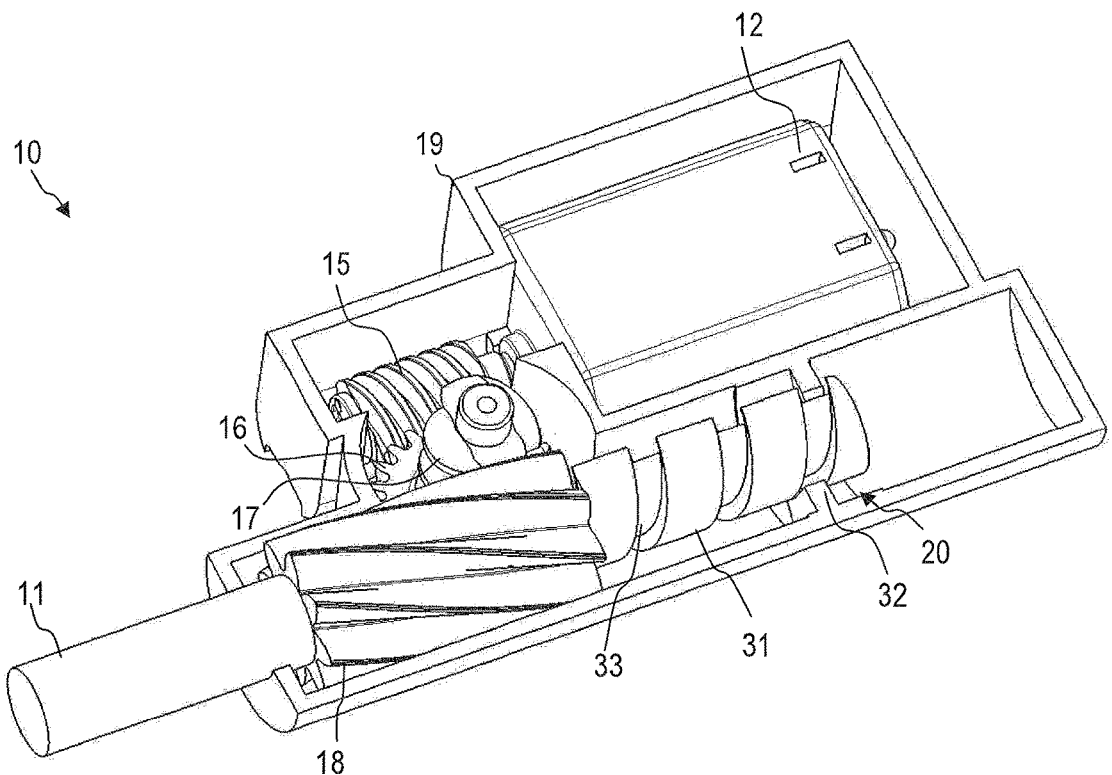
FIG. 5 is a perspective view of a latch actuator according to another embodiment with a cover removed.
Figure 6:
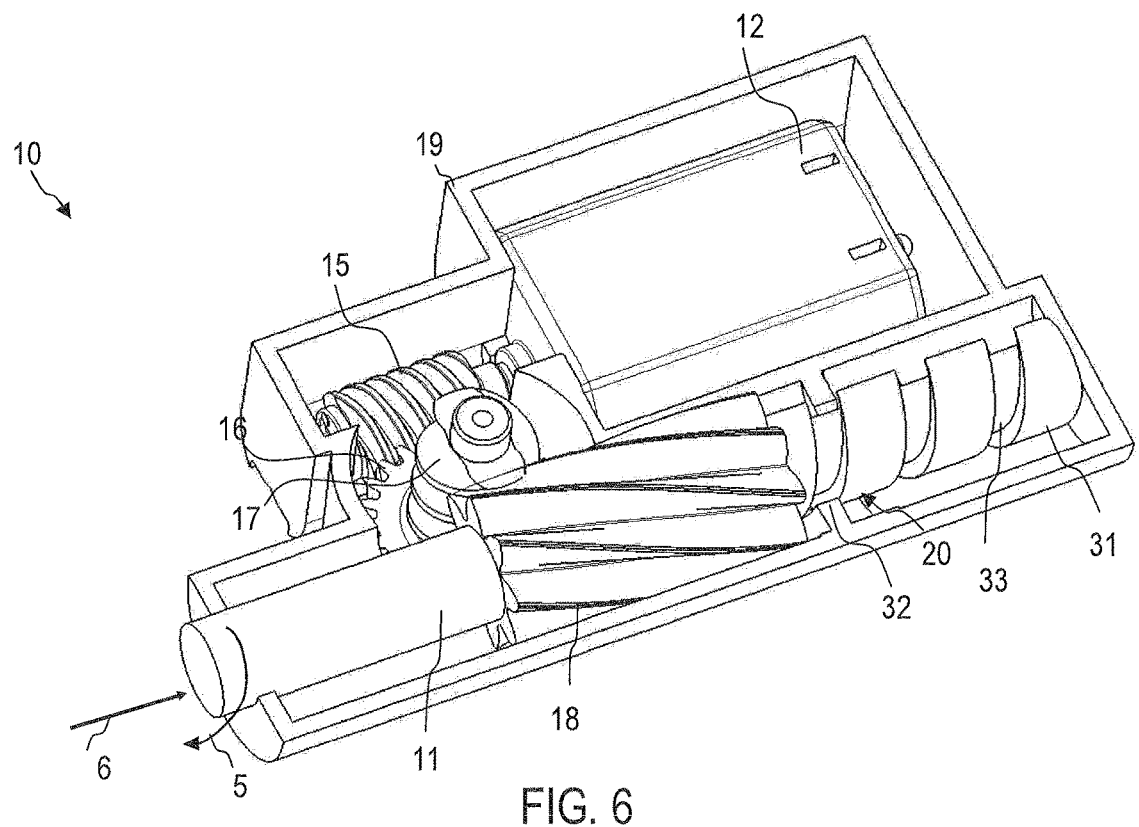
FIG. 6 is another perspective view of the latch actuator of FIG. 5.
Figure 7:
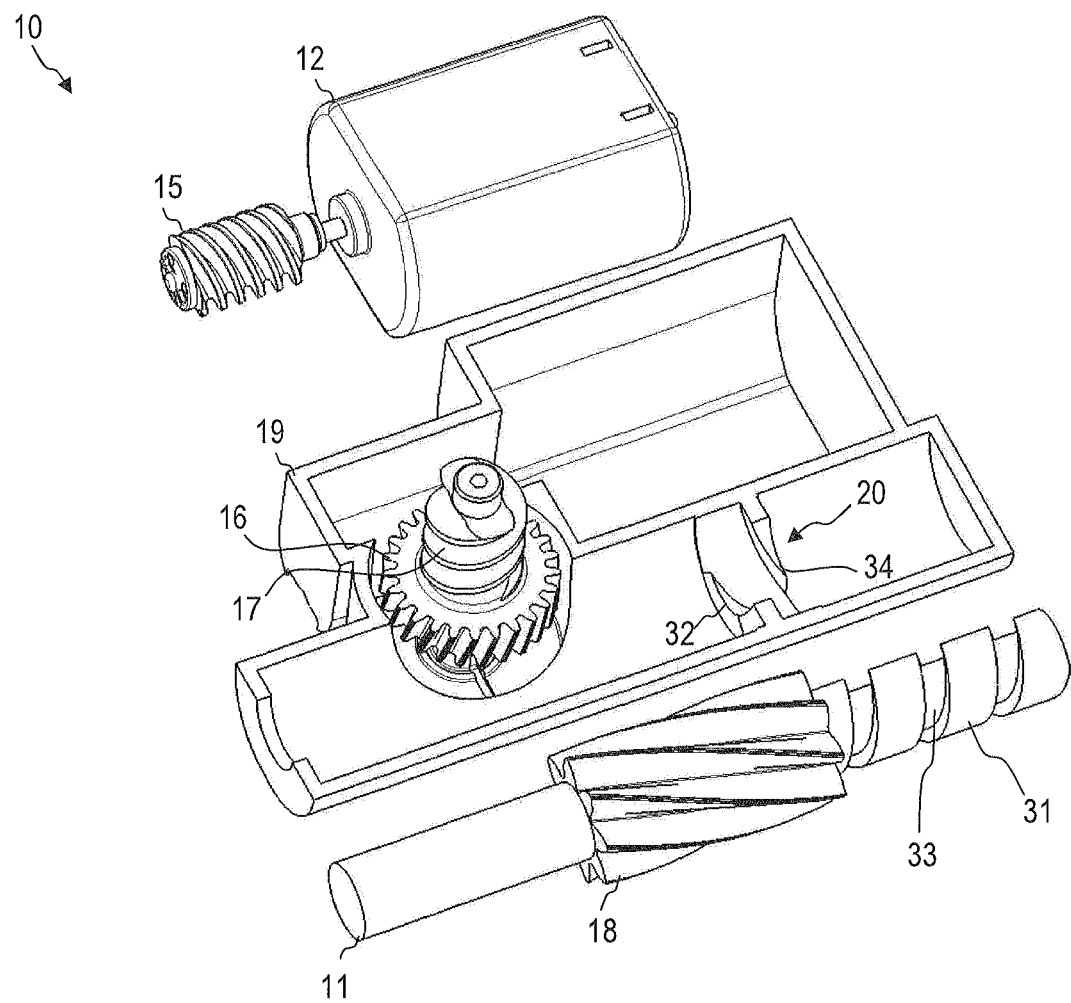
FIG. 7 is an exploded view of the latch actuator of FIG. 5.

FIG. 5 shows a latch actuator 10 according to another embodiment with a cover removed. FIG. 6 shows the latch actuator 10 of FIG. 5 when the spindle 11 has been displaced along its axis by rotation of the spindle 11. FIG. 7 is an exploded view of the latch actuator 10 of FIG. 5 with the cover removed.

The latch actuator 10 generally comprises a motor 12 and a speed reduction gearing. The motor 12 and speed reduction gearing may be configured as described with reference to FIG. 2 to FIG. 4.

The latch actuator 10 comprises a spindle 11 which has a threaded portion 18. The threaded portion 18 may be engaged with the further worm 17 of the worm reduction gearing. The threaded portion 18 may be configured as explained with reference to The latch actuator 10 comprises a motion conversion mechanism. The motion conversion mechanism comprises a bushing 20 of the housing 19. The bushing 20 rotatably supports the spindle 11. The bushing 20 includes internal projections 32, 34 with slanted faces which extend about the rotation axis of the spindle 11 with a pitch.

The spindle 11 has an external thread 31 on an outer surface thereof. The external thread 31 may be formed when the spindle 11 is molded, for example. The external thread 31 may be provided in addition to the threaded portion 18. The external thread 31 and the threaded portion 18 may be spaced from each other.

The external thread 31 has a pitch which is equal to that of the slanted faces of the internal projections 32, 34. The thread 31 includes a recess 33 which may extend helically around the axis of the spindle. The internal projections 32, 34 may be received in the recess in such a way that the slanted faces of the internal projections 32, 34 engage the thread 31.

The pitch of the external thread 31 of the spindle and of the bushing 20 may be different from a pitch of the threaded portion 18 of the spindle 11.

The latch actuator 10 may comprise a cover (not shown in FIG. 5 to FIG. 7) configured to be attached to the housing 19. The cover may also have a bushing for the spindle which is combined with the bushing 20 of the housing 19 when the cover is attached to the housing 19 such that the thread 31 of the spindle 11 can threadingly engage the internal thread defined by the bushing 20 of the housing 19 and the bushing of the cover.

The motion conversion mechanism formed by the bushing 20 and the external thread 31 of the spindle 11 which both have the same pitch along the axis of the spindle causes the spindle to be displaced in a first direction 6 along its rotation axis when the spindle 11 performs a rotational movement 5 in a first direction of rotation. When a direction of rotation of the motor 12 is reversed, the motion conversion mechanism causes the spindle to be displaced in a second direction opposite to the first direction 6 along its rotation axis when the spindle 11 performs a rotational movement in a second direction of rotation which is opposite to the first direction of rotation.

While the spindle 11 is displaces along its rotation axis, the threaded portion 18 remains engaged with the further worm of the speed reduction gearing. The threaded portion 18 may have a length along the spindle 11 which is greater than a diameter of the further worm 17. The threaded portion 18 may have a length along the spindle 11 which is greater than the maximum distance by which the spindle 11 is displaceable by the latch actuator 10.

Figure 8:
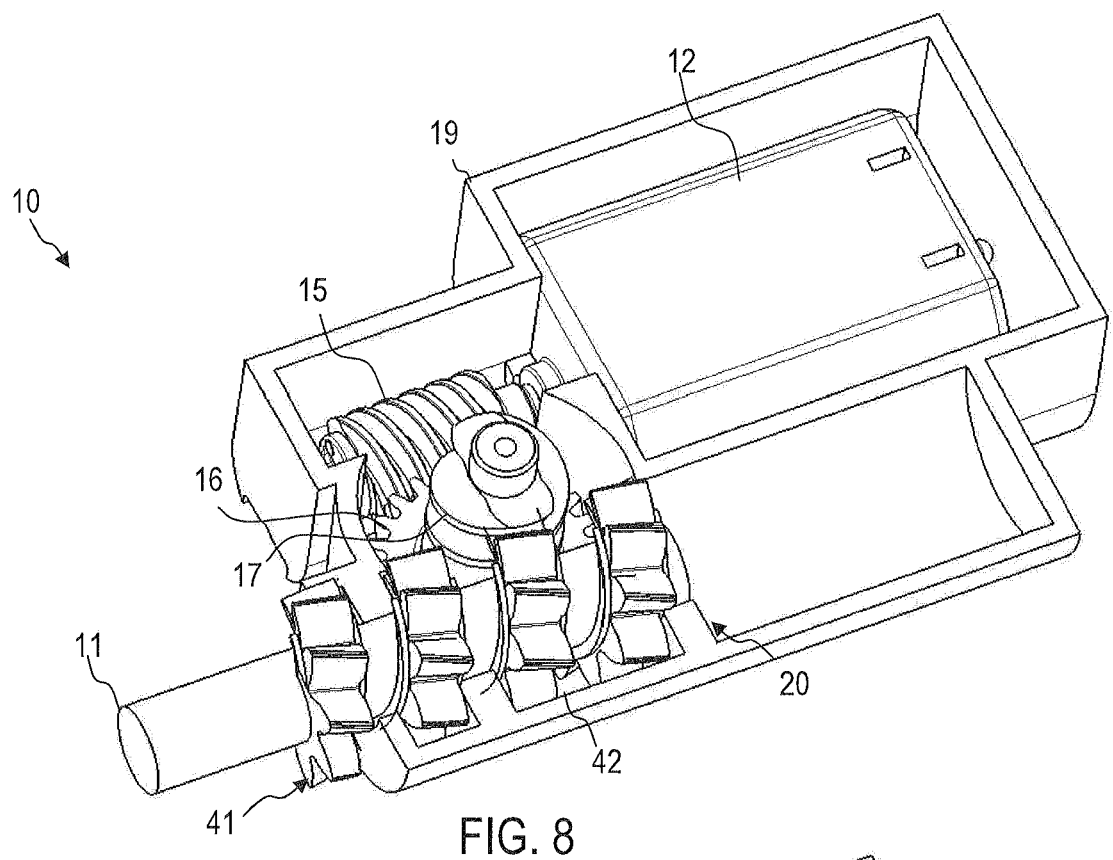
FIG. 8 is a perspective view of a latch actuator according to another embodiment with a cover removed.
Figure 9:
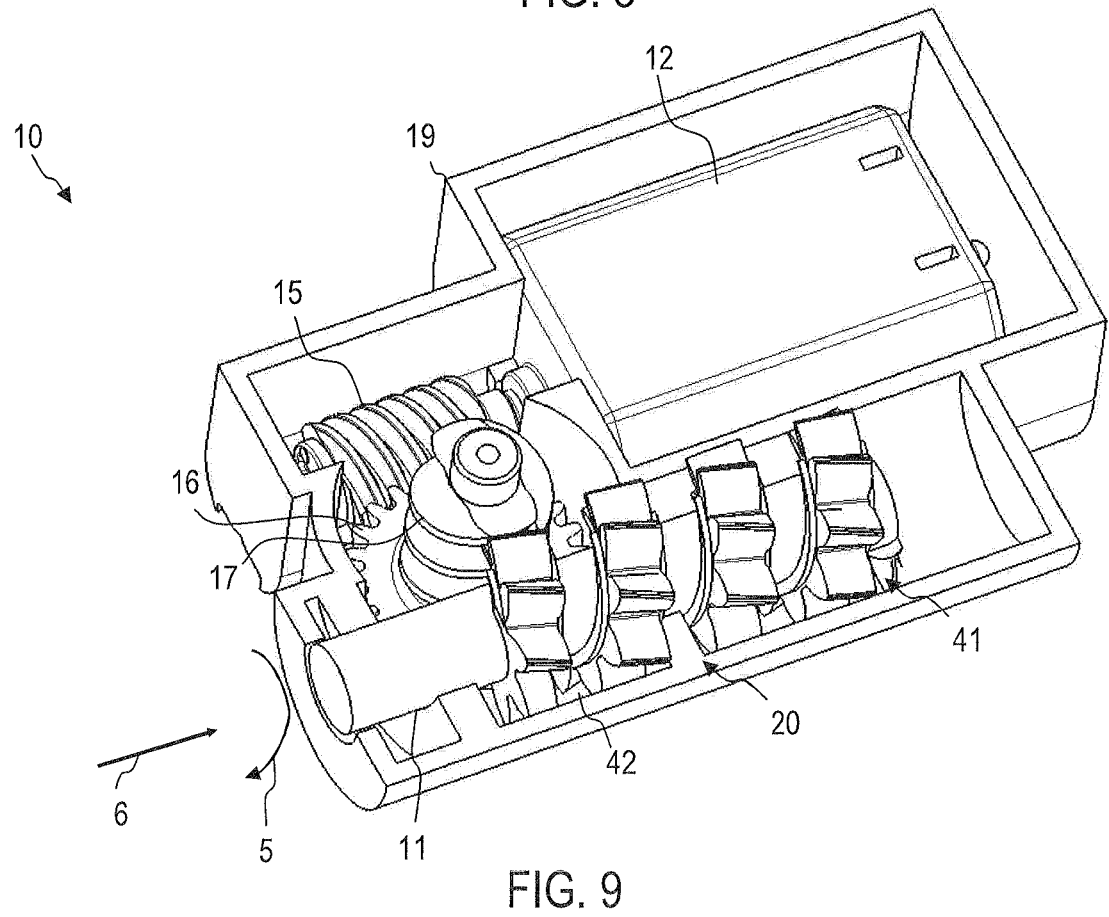
FIG. 9 is another perspective view of the latch actuator of FIG. 8.
Figure 10:
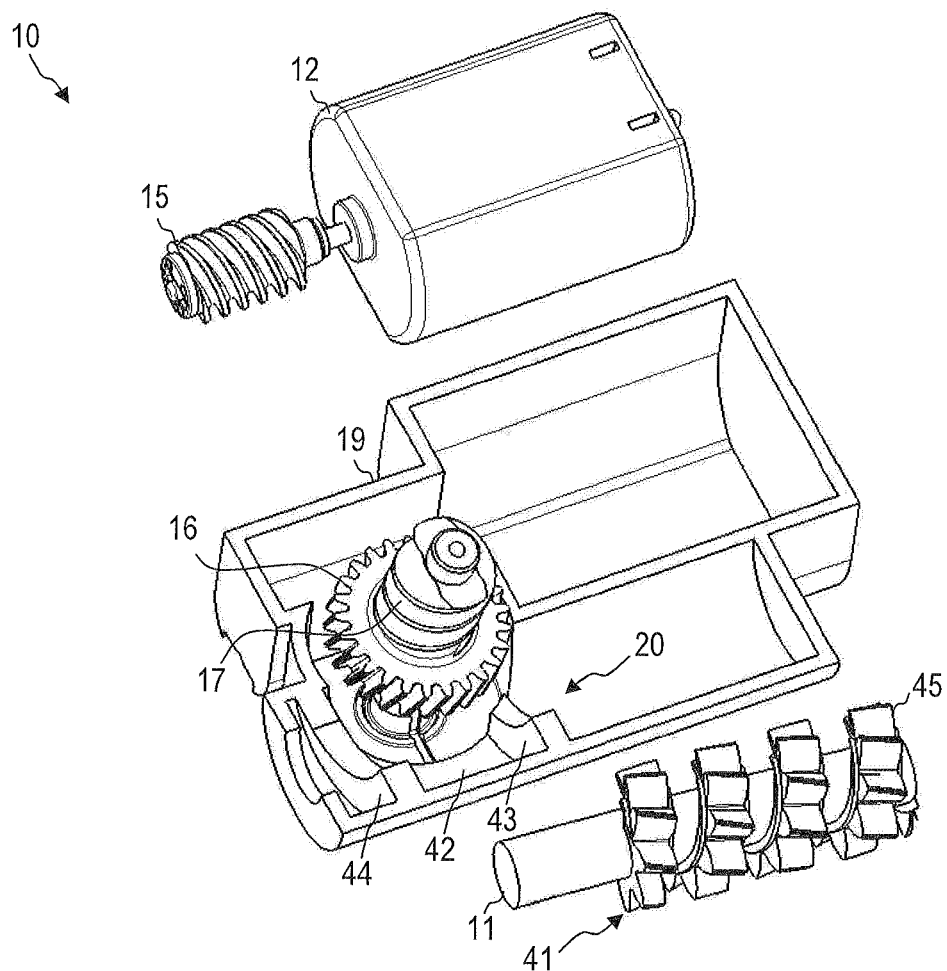
FIG. 10 is an exploded view of the latch actuator of FIG. 8.

FIG. 8 shows a latch actuator 10 according to another embodiment with a cover removed. FIG. 9 shows the latch actuator 10 of FIG. 8 when the spindle 11 has been displaced along its axis by rotation of the spindle 11. FIG. 10 is an exploded view of the latch actuator 10 of FIG. 8 with the cover removed.

The latch actuator 10 generally comprises a motor 12 and a speed reduction gearing. The motor 12 and speed reduction gearing may be configured as described with reference to FIG. 2 to FIG. 4.

The latch actuator 10 comprises a motion conversion mechanism. The motion conversion mechanism comprises a bushing 20 of the housing 19. The bushing 20 rotatably supports the spindle 11. The bushing 20 includes at least one recess 42 delimited by internal projections 43, 44. The internal projections 43, 44 have slanted faces which extend about the rotation axis of the spindle 11 with a pitch.

The spindle 11 has a threaded portion 41. The threaded portion 41 may be engaged with the further worm 17 of the worm reduction gearing. The threaded portion 41 may comprise a plurality of teeth. The plurality of teeth 45 may be arranged such that the plurality of teeth form a spiral shape on the surface of the spindle 11. A base of the plurality of teeth 45 may form a helix which winds around the spindle 11. The helix defined by the base line of the plurality of teeth 45 may have a pitch which is equal to the pitch of the slanted faces of the internal projections 43, 44.

The threaded portion 41 may be engaged both with teeth of the further worm 17 of the speed reduction gearing and with the internal projections 43, 44 of the speed reduction gearing. Sides of the teeth may abut on the internal projections 43, 44, such that the spindle 11 is displaced axially along the axis of the spindle 11 when the spindle 11 rotates.

The latch actuator 10 may comprise a cover (not shown in FIG. 8 to FIG. 10) configured to be attached to the housing 19. A rubber sealing may be used to seal the assembly of cover and housing 19.

The motion conversion mechanism is formed by the threaded portion 41 and the bushing 20 of the spindle 11 provided in the housing 19. The teeth of the threaded portion 41 form a structured projection which extends from the surface of the spindle 11 and extends about the surface of the spindle with a pitch. The internal projections 43, 44 have the same pitch along the axis of the spindle and cause the spindle 11 to be displaced in a first direction 6 along its rotation axis when the spindle 11 performs a rotational movement 5 in a first direction of rotation. When a direction of rotation of the motor 12 is reversed, the motion conversion mechanism causes the spindle to be displaced in a second direction opposite to the first direction 6 along its rotation axis when the spindle 11 performs a rotational movement in a second direction of rotation which is opposite to the first direction of rotation.

While the spindle 11 is displaces along its rotation axis, the threaded portion 41 remains engaged with the further worm 17 of the speed reduction gearing. The threaded portion 41 may extend along a length of the spindle 11 which is greater than a diameter of the further worm 17. The threaded portion 18 may extend along a length of the spindle 11 which is greater than the maximum distance by which the spindle 11 is displaceable by the latch actuator 10.

In any one of the embodiments, an end of the spindle 11 may be received in a receptacle of the latch mechanism. The receptacle rotatably received the spindle, as will be explained in more detail with reference to FIG. 11.

Figure 11:
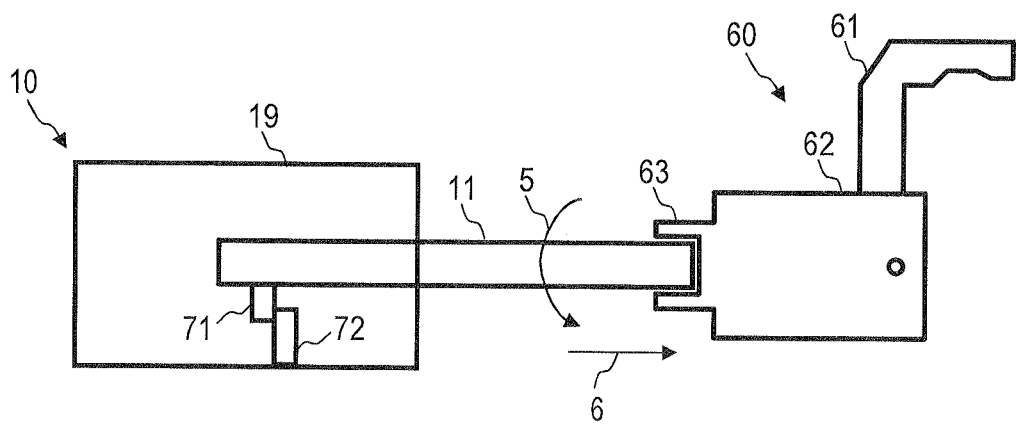
FIG. 11 is a cross-sectional view of a latch actuator according to an embodiment coupled to a latch mechanism.

FIG. 11 is a schematic view of a system according to an embodiment which comprises a latch actuator 10 according to an embodiment and a latch mechanism 60. The latch mechanism 60 comprises a latch 61 and may comprise a linkage 62. The linkage 62 may comprise one or several displaceable components which, in operation of the lock actuator, are displaced by the spindle 11 relative to the housing 19 of the latch actuator 10.

The latch mechanism 60 comprises a receptacle to receive an end of the spindle 11. The receptacle may be provided at the point of contact between the spindle 11 and the latch mechanism 60. The receptacle may be defined by a cap 63. The cap 63 may be rotationally fixed. The cap 63 may comprise an internal bushing or bearing for supporting an end of the spindle 11. The cap 63 may be formed integrally with the latch mechanism 60. For illustration, the cap 63 may be formed integrally with a component of the linkage 62 or with the latch 61 itself.

In any one of the embodiments, the spindle 11 may have one end stop or several end stops to define the path by which the spindle 11 may travel along its axial direction. As shown in FIG. 1, the spindle 11 may have an end stop 71. The end stop 71 may be configured to contact a corresponding abutment surface 72 of the housing 19. Contact between the end stop 71 and the corresponding abutment surface 72 defines an end of a travel path of the spindle 11 along its axial direction. A further end stop and associated abutment surface may be provided on the spindle or the housing, respectively, to define an opposite end of the travel path of the spindle 11 along its axial direction.

Latch actuators according to embodiments may be used in any one of a wide variety of devices. Vehicles are one exemplary field of application, but the embodiments are not limited thereto. For illustration, latch actuators according to embodiment may also be installed in buildings, such as entry systems for residential or office buildings.

Figure 12:
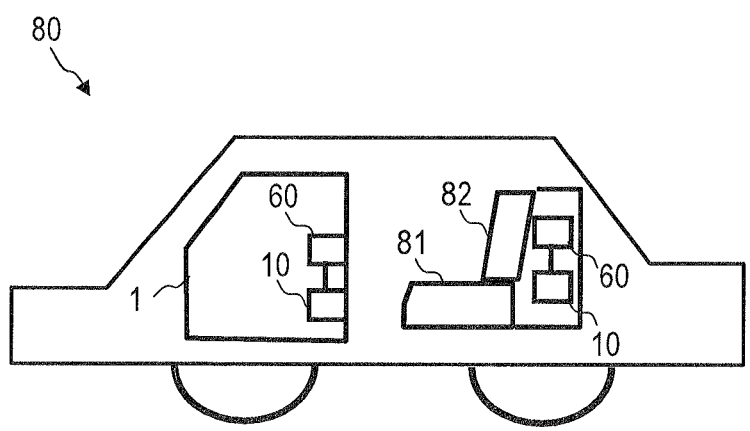
FIG. 12 is a schematic view of a vehicle comprising at least one latch actuator according to an embodiment.

FIG. 12 is a schematic view of a vehicle 80 according to an embodiment. The vehicle 80 comprises a door 1 according to an embodiment. The door 1 comprises a latch mechanism 60 of a door lock and a latch actuator 10 to actuate the door lock. One or several further latch actuators according to embodiments may be installed in the vehicle 80. The vehicle may comprise a latch mechanism 60 for locking at least one of a seat 81 or a backrest 82 in a position. The latch actuator 10 may be coupled to the latch mechanism 60 for selectively unlocking the seat 81 or backrest 82.

While embodiments have been described with reference to the drawings, modifications and alterations may be used in various other embodiments. For illustration, while a speed reduction gearing configured as a two-stage worm reduction gearing has been described with reference to the drawings, the speed reduction gearing may have any one of a wide variety of different configurations. For illustration, a speed reduction gearing having only one speed reduction stage may be used. A speed reduction gearing having three or more than three speed reduction stages may be used. The reduction gearing does not need to comprise one or more worm gearings, but may use other speed reduction stages in addition or alternatively to worm gearings.

While embodiments have been described in which the spindle is rotatable about an axis which is parallel to an axis of an output shaft of the motor, the rotation axis of the spindle may also be arranged so as to be oblique to the axis of the output shaft of the motor.

While the latch actuator may be received in a cavity of a vehicle door, the latch actuator may also be installed in other locations. For illustration, the latch actuator may be installed in a pillar of a vehicle body.

It will be appreciated that various technical effects can be attained using the latch actuator and methods of embodiments. The latch actuator has a compact construction and low weight, which allows it to be integrated in a compact installation space.

While exemplary embodiments have been described in the context of latch actuators for vehicles, embodiments of the invention are not limited to this particular field of application. Rather, embodiments of the invention may be advantageously employed to provide a power latch actuator for a wide variety of latch mechanisms.

The invention claimed is:

1. A latch actuator, comprising:
   a motor;
   a speed reduction gearing coupled to an output shaft of the motor;
   a spindle having a threaded portion in engagement with the speed reduction gearing, the spindle being supported to be rotatable about a rotational axis, said threaded portion being formed integrally as one piece with and rotationally fixed relative to the spindle; and
   a motion conversion mechanism configured to cause a longitudinal displacement of the spindle along the rotational axis when the spindle rotates.

2. The latch actuator of claim 1, wherein the motion conversion mechanism comprises an engagement feature engaged with the spindle, the engagement feature having a pitch along the axis.

3. The latch actuator of claim 2, wherein the engagement feature is stationary relative to the motor.

4. The latch actuator of claim 2, wherein the latch actuator comprises a housing in which the motor and the speed reduction gearing are accommodated, wherein the engagement feature is formed on the housing.

5. The latch actuator of claim 2, wherein the engagement feature comprises a recess engaged with a projection of the spindle, wherein the recess is delimited by a wall which has the pitch.

6. The latch actuator of claim 5, wherein the projection of the spindle is in the form of a pin projecting from a surface of the spindle.

7. The latch actuator of claim 5, wherein at least a portion of the projection has a pitch which is equal to the pitch of the wall delimiting the recess.

8. The latch actuator of claim 5, wherein the threaded portion in engagement with the speed reduction gearing forms the projection engaged with the recess.

9. The latch actuator of claim 5, wherein the threaded portion comprises a plurality of teeth, wherein a base of the plurality of teeth extends helically about the spindle.

10. The latch actuator of claim 5, wherein the engagement feature is formed in a bushing of the spindle.

11. The latch actuator of claim 1, wherein an end of the spindle is rotatably received in a cap of a latch mechanism.

12. The latch actuator of claim 1, wherein the speed reduction gearing comprises at least one worm reduction gearing.

13. The latch actuator of claim 1, wherein the spindle comprises an end stop to limit a displacement of the spindle along the axis.

14. A system, comprising:
a latch mechanism comprising a latch; and
the latch actuator of claim 1, the latch actuator being configured to actuate the latch.

* * * * *